United States Patent [19]

Wilson

[11] 4,067,942

[45] Jan. 10, 1978

[54] HEAT TREATMENT OF RESINOUS BLOCK COPOLYMER TO IMPROVE CLARITY

[75] Inventor: Newton R. Wilson, Bartlesville, Okla.

[73] Assignee: Phillips Petroleum Company, Bartlesville, Okla.

[21] Appl. No.: 660,071

[22] Filed: Feb. 23, 1976

[51] Int. Cl.² .......................... B29C 25/00; B29F 5/00
[52] U.S. Cl. ............................ 264/80; 260/23.7 R; 260/879; 260/880 R; 264/176 R; 264/234; 264/235; 264/319; 264/345
[58] Field of Search .................. 264/80, 176 R, 234, 264/235, 319, 345, 346; 260/23.7 R, 879, 880

[56] References Cited

U.S. PATENT DOCUMENTS

| | | | |
|---|---|---|---|
| 2,379,557 | 7/1945 | Watkins | 264/345 |
| 2,990,580 | 7/1961 | Foster | 264/346 |
| 3,281,383 | 10/1966 | Zelinski et al. | 260/23.7 R |
| 3,301,935 | 1/1967 | Stoeckhert | 264/321 |
| 3,397,263 | 8/1968 | Werner | 264/216 |
| 3,555,135 | 1/1971 | Paul | 264/235 |
| 3,639,517 | 2/1972 | Kitchen et al. | 260/879 |
| 3,651,181 | 3/1972 | Ramaika | 264/80 |
| 3,655,848 | 4/1972 | Young et al. | 264/98 |
| 3,851,039 | 11/1974 | Blackwelder | 264/345 |

*Primary Examiner*—Jeffrey R. Thurlow

[57] ABSTRACT

Extruded articles of resinous transparent monovinyl-substituted aromatic compound/conjugated diene block copolymer are subjected to a brief heat treatment which results in a substantial improvement in clarity.

16 Claims, No Drawings

HEAT TREATMENT OF RESINOUS BLOCK COPOLYMER TO IMPROVE CLARITY

BACKGROUND OF THE INVENTION

This invention relates to finish treatment for extruded resinous monovinyl-substituted aromatic compound-/conjugated diene block copolymers.

In the past few years there have been developed resinous block copolymers comprising a conjugated diene block and terminal monovinyl-substituted aromatic compound blocks. These copolymers, produced with a monovinyl-substituted aromatic compound component sufficiently large to be resinous, are ideally suited for many molding applications, either alone or compounded with other resins. Such polymers tend to exhibit relatively good clarity, and in particular radial polymers of this type exhibit outstanding clarity when fabricated into molded articles. Clarity is somewhat more of a problem with extruded articles, however, due to the prominence of small scratch marks such as those made by imperfections in the die or mandrel surface.

SUMMARY OF THE INVENTION

It is an object of this invention to provide extruded articles of a monovinyl-substituted aromatic compound-/conjugated diene block copolymer having good clarity; it is a further object of this invention to improve the clarity of extruded articles made of a conjugated diene/monovinyl-substituted aromatic compound block copolymer.

In accordance with this invention, a monovinyl-substituted aromatic compound/conjugated diene block copolymer is formed into an extrudate, cooled to a solid condition, and then exposed to a heat source for a period of time within the range of 0.01 to 1 second.

DESCRIPTION OF THE PREFERRED EMBODIMENTS

The resinous block copolymers used to make the articles of this invention can include both linear and radial polymers. Radial polymers comprise those resinous polymers having at least three monovinyl-substituted aromatic compound/conjugated diene block copolymer chains radiating from a central nucleus, the resinous monovinyl-substituted aromatic compound block being at the terminal end of these chains. The linear resinous block copolymers are conventionally designated as ABA polymers with the terminal blocks being monovinyl-substituted aromatic component and the internal block being the conjugated diene.

The word "resinous" is used herein in its conventional sense to denote a normally solid material not having elastic properties. Generally such resinous materials used in this invention will have a Shore D hardness (ASTM D 1706-61) of greater than 62, preferably greater than 69.

Preparation of the radial polymers is broadly disclosed in Zelinski et al U.S. Pat. No. 3,281,383 issued Oct. 25, 1966, the disclosure of which is hereby incorporated by reference, it being understood that the radial block copolymers used to make the articles of this invention are limited to those having resinous characteristics.

Resinous block copolymers having branches of polymer which demonstrate a plurality of modes or peaks on a gel permeation chromatograph curve, i.e., the molecular weight distribution curve as disclosed in Kitchen et al, U.S. Pat. No. 3,639,517, the disclosure of the preparation of which is hereby incorporated by reference, are particularly suitable.

The resinous radial block copolymers for use in this invention can broadly be viewed as any radial vinyl-substituted aromatic compound/conjugated diene block copolymer prepared by first polymerizing the vinyl-substituted aromatic compound in the presence of an organolithium initiator, thereafter adding said conjugated diene monomer and polymerizing it to produce a block copolymer containing an active lithium atom on the end of the polybutadiene portion of the polymer chain as more fully described in said Zelinski et al patent. This lithium-terminated polymer is then reacted with a compound which has at least three reactive sites capable of reacting with the lithium-carbon bond and adding to the carbon possessing this bond in the polymer. The result of this sequential addition of monovinyl-substituted aromatic compound, conjugated diene and coupling agent is a polymer having relatively long branches which radiate from the nucleus formed by the polyfunctional compound which is reacted with the lithium-terminated polymer. Preferred organolithium compounds can be represented by the formula: RLi, wherein R is a hydrocarbon radical selected from the group consisting of aliphatic, cycloaliphatic, and aromatic radicals and cominbations thereof containing 1 to 20 carbon atoms, such as n-butyllithium, cyclohexyllithium, phenyllithium, p-tolyllithium, and the like.

Types of compounds having at least three reactive sites include polyepoxides, polyisocyanates, polyimines, polyaldhehydes, polyketones, polyanhydrides, polyesters, polyhalides of polyvalent elements such as $SnCl_4$, $SiCl_4$ and the like.

These resinous radial block copolymers comprise about 70 to 95 weight percent polymerized monovinyl-substituted aromatic hydrocarbon monomer containing from 8 to 18 carbon atoms per molecule and from about 30 to 5 weight percent polymerized conjugated diene monomer containing from about 4 to 12 carbon atoms per molecule based on the total weight of the resinous block copolymer. Styrene and 1,3-butadiene are the preferred monomers. Preferably the copolymers contain a weight ratio of monovinyl-substituted aromatic compound to conjugated diene within the range of 70:30 to 85:15. The copolymer preferably has a melt flow in the range of 0.5 to 20 grams/10 minutes as determined by ASTM D 1238-65T, condition G. The copolymer branches can be uniform in molecular weight distribution within the branches, or they can have a polymodal distribution obtained by charging the monovinyl-substituted aromatic hydrocarbon monomer and initiator in a plurality of increments as described in said Kitchen et al patent referred to hereinabove.

Examples of suitable monovinyl-substituted aromatic compounds other than styrene are 3-methyl styrene, 4-n-propyl styrene, 4-cyclohexyl styrene, 4-dodecyl styrene, 2-ethyl-4-benzyl styrene, 4-p-tolyl styrene, 4(4-phenyl-n-butyl) styrene, 1-vinylnaphthalene, 2-vinylnaphthalene, and mixtures thereof. Examples of suitable conjugated dienes other than 1,3-butadiene are isoprene, piperylene, 3-butyl 1,3-octadiene, phenyl-1,3-butadiene and mixtures thereof.

The production of ABA polymers is well known in the art. Two methods of production are: (1) sequential polymerization of the monovinyl-substituted aromatic compound block, the conjugated diene block, and the second vinyl-substituted aromatic compound block and (2) production of an AB- block which is coupled with a similar block by means of a difunctional coupling agent. The same monomers and ratios of monomers are used for these polymers as for the preparation of the radial block copolymers described hereinabove.

The block copolymers used in preparing the articles of the invention will generally contain conventional stabilizers.

Since the prime purpose of this invention is to provide articles having greater clarity, the polymer generally will not contain pigments and the like which would interfere with the clarity, although the clarity of even pigmented materials benefit to some extent from the invention in that a smoother more attractive surface is produced when pigmented materials are treated in accordance with this invention.

Although the invention is primarily contemplated for use in the production of high clarity tubing, it is broadly applicable to the production of any extrudate including sheet and shaped profiles. Treatment of film is outside the scope of this invention because the invention necessitates melting only a very thin surface layer, leaving the bulk of the thickness of the extrudate unaffected. Generally the extrudate will have a wall thickness of within the range of about 10 to about 500 mils, preferably 12 to 200 mils. The portion melted generally extends little below the depth of the grooves of the scratches and imperfections, i.e., generally less than 10 percent of the wall thickness of the extrudate with a further provision that the portion melted is generally less than 5 mils, more preferably about 0.1 to 2 mils.

Conventional heat sources are used to provide the necessary heat. Most readily applicable is flame treatment apparatus such as is used to flame treat polyolefin surfaces for improved adhesion. Hot gas and infrared heaters can also be used. Of course the length of time of treatment necessary to effect the desired micromelting of the surface will vary considerably depending upon the intensity and proximity of the heat source. With flame or hot gases actually impinging upon the article or with infrared heaters within 0.1 to 10 inches from the article a treatment time within the range of 0.1 to 1, preferably 0.25 to 0.4 seconds is sufficient. This allows a reasonable linear speed for the extrudate past the heat source. For instance, an annular burner having a width of 1 inch could be used with a linear speed of 12 to 20 feet per minute (3.7 to 6.1 meters per minute). Higher speeds up to 100 feet a minute or even higher (depending on the equipment limitations) can be used with an appropriately wider heat source (up to 1 foot or more) or higher intensity heat. The invention is primarily directed to treating the exterior surface of tubing, although as noted hereinabove it is also applicable to thick sheet and profiles and can even be used to treat the interior of the tubing by rapidly inserting and withdrawing a heat source, although this is not the primary thrust of the invention. Because of the speed with which this treatment is carried out and the very minor depth to which the surface is melted, the article is not subjected to any visble heat distortion during the process. Rather the process serves to fuse a minute layer of the resin, thereby smoothing out surface imperfections by a plastic flow. The imperfections being smoothed out are not gross scratches but rather minor imperfections attributed to minute scratches in the dies, dust particles, and the like. As will be shown by the example hereinbelow, this treatment effects a substantial improvement in clarity. It is quite unexpected that such a minor treatment of the surface of this particular class of polymers would bring about this improvement in clarity in view of the fact that such treatments of other polymers does not bring about noticeable changes in clarity.

EXAMPLE

A 50—50 parts be weight blend of (1) a regular radial block copolymer of styrene/butadiene (75/25 weight percent), density (ASTM D 792-66) 1.01, Melt Flow Rate (ASTM D 1238-65T, Condition G) 8.0 g/10 minutes and (2) a polymodal radial block copolymer of styrene/butadiene (75/25 weight percent), density 1.04, Melt Flow Rate 5.0 g/10 minutes, both made as in Example 1 of Kitchen et al U.S. Pat. No. 3,639,517, was prepared.

A 1-inch I.D. (2.54 cm) tube with a wall thickness of 15 mils was extruded using a conventional tube-forming extruder at 420° F (216° C). Although the finished tube was reasonably clear, it had numerous surface imperfections, scratches, crazes and the like. A section of this tube was passed through an annular flame treater with a width of 1 inch at a rate of about 15 linear feet per minute (about 4.6 meters per minute) to provide a residence time of about 0.33 seconds. The treated tube section was clear and free from surface imperfections.

This illustrates the operation of the process and effectiveness of the treatment to eliminate surface imperfections of extruded articles made of this type of copolymer.

While this invention has been described in detail for the purpose of illustration, it is not to be construed as limited thereby but is intended to cover all changes and modifications within the spirit and scope thereof.

What is claimed is:

1. A process for producing a transparent extrudate comprising:
    forming a molten extrudate of a resinous transparent monovinyl-substituted aromatic compound/conjugated diene block copolymer having terminal blocks of said monovinyl-substituted aromatic compound, such extrudate being at least about 10 mils thick;
    cooling said extrudate to a solid state; and then
    applying heat to a surface of the thus-solidified extrudate for a short time so as to melt only a thin surface layer, thereby increasing clarity without visible distortion of the extrudate.

2. A process according to claim 1 wherein said resinous copolymer is a resinous block copolymer of butadiene and styrene.

3. A process according to claim 1 wherein the weight ratio of said monovinyl-substituted aromatic compound to said conjugated diene is within the range of 70:30 to 85:15.

4. A process according to claim 1 wherein the time for said treatment is within the range of 0.25 to 0.4 second.

5. A method according to claim 1 wherein said heat is provided by a flame.

6. A method according to claim 1 wherein a wall thickness of said extrudate is within the range of about 10 to about 500 mils.

7. A method according to claim 1 wherein said extrudate is a tubing.

8. A method according to claim 7 wherein the treatment is carried out on the outer surface thereof.

9. A method according to claim 8 wherein said treatment is carried out for a time within the range of 0.25 to 0.4 second.

10. A method according to claim 9 wherein said extrudate is passed through a flame at a linear velocity of 12 to 20 feet per minute.

11. A method according to claim 10 wherein said copolymer is a copolymer of styrene and butadiene having a weight ratio of styrene:butadiene within the range of 70:30 to 85:15.

12. A process according to claim 1 wherein said copolymer is linear.

13. A process according to claim 1 wherein said copolymer is radial.

14. A process according to claim 1 wherein said time of said treatment is within the range of 0.01 second to 1 second.

15. A process according to claim 1 wherein the weight ratio of said monovinyl-substituted aromatic compound to said conjugated diene is within the range of about 70:30 to about 95:5.

16. A process according to claim 10 wherein said copolymer is a copolymer of styrene and butadiene having a weight ratio of styrene:butadiene within the range of about 70:30 to about 95:5.

* * * * *